US009593027B2

(12) United States Patent
Kisailus et al.

(10) Patent No.: US 9,593,027 B2
(45) Date of Patent: Mar. 14, 2017

(54) POROUS METAL OXIDE AND METAL OXIDE-ORGANIC NANOCOMPOSITES, METHODS OF MAKING AND USES THEREOF

(71) Applicant: The Regents of the University of California, Oakland, CA (US)

(72) Inventors: David Kisailus, Riverside, CA (US); Nichola Kinsinger, Riverside, CA (US)

(73) Assignee: The Regents of the University of California, Oakland, CA (US)

( * ) Notice: Subject to any disclaimer, the term of this patent is extended or adjusted under 35 U.S.C. 154(b) by 252 days.

(21) Appl. No.: 13/783,266

(22) Filed: Mar. 2, 2013

(65) Prior Publication Data

US 2014/0077425 A1 Mar. 20, 2014

Related U.S. Application Data

(60) Provisional application No. 61/606,289, filed on Mar. 2, 2012.

(51) Int. Cl.
| | | |
|---|---|---|
| C02F 1/32 | (2006.01) | |
| C01G 23/047 | (2006.01) | |
| C01G 23/08 | (2006.01) | |
| C01G 1/02 | (2006.01) | |
| C01G 1/12 | (2006.01) | |
| C01B 21/06 | (2006.01) | |
| C01B 13/36 | (2006.01) | |
| C01B 17/20 | (2006.01) | |
| C01B 19/00 | (2006.01) | |
| H01M 4/48 | (2010.01) | |

(52) U.S. Cl.
CPC .............. *C02F 1/32* (2013.01); *C01B 13/366* (2013.01); *C01B 17/20* (2013.01); *C01B 19/007* (2013.01); *C01B 21/06* (2013.01); *C01G 1/02* (2013.01); *C01G 1/12* (2013.01); *C01G 23/047* (2013.01); *C01G 23/08* (2013.01); *C02F 2305/08* (2013.01); *C02F 2305/10* (2013.01); *H01M 4/48* (2013.01); *Y02W 10/37* (2015.05)

(58) Field of Classification Search
CPC .......... C02F 1/32; C02F 2305/10; F24J 2/484
USPC ................. 264/624, 639, 667; 977/847, 746
See application file for complete search history.

(56) References Cited

U.S. PATENT DOCUMENTS

| | | | | |
|---|---|---|---|---|
| 4,508,753 A | * | 4/1985 | Stepan .................. | H01L 21/705 257/E21.534 |
| 2002/0107140 A1 | * | 8/2002 | Hampden-Smith ...... | B01J 2/003 502/185 |
| 2002/0189400 A1 | * | 12/2002 | Kodas ........................ | B01J 2/02 75/243 |

(Continued)

FOREIGN PATENT DOCUMENTS

WO WO2010/008040 A1 * 1/2010 ............. C01B 13/14

*Primary Examiner* — Nahida Sultana
(74) *Attorney, Agent, or Firm* — Joseph R. Baker, Jr.; Gavrilovich, Dodd & Lindsey LLP (57) ABSTRACT

The disclosure provides relates to compositions and methods for water treatment. It also addresses a method for synthesizing $TiO_2$ (and other metal oxides) with or without dopants. This method enables control over size, phase, morphology and porosity and specific surface area of these materials. The disclosure also provides metal oxide composites that can be used in photocatalysts, photovoltaics, energy storage materials (e.g., Li-ion anodes), and solar hydrogen applications.

14 Claims, 8 Drawing Sheets

(56) References Cited

U.S. PATENT DOCUMENTS

| | | | |
|---|---|---|---|
| 2003/0108664 A1* | 6/2003 | Kodas | C09D 11/30 427/125 |
| 2003/0161959 A1* | 8/2003 | Kodas | C09D 11/30 427/376.2 |
| 2006/0167147 A1* | 7/2006 | Asgari | A61K 9/0024 524/174 |
| 2006/0240256 A1* | 10/2006 | Woo | B82Y 30/00 428/402 |
| 2007/0142568 A1* | 6/2007 | Kim | A63B 37/0003 525/375 |
| 2008/0213189 A1* | 9/2008 | Lee | A61K 47/48215 424/9.32 |
| 2009/0246251 A1* | 10/2009 | Orgambide | A61K 38/16 424/423 |
| 2009/0280329 A1* | 11/2009 | Rukavina | B32B 17/1077 428/412 |
| 2010/0047564 A1* | 2/2010 | Kim | B82Y 30/00 428/336 |
| 2011/0190432 A1* | 8/2011 | Tanabe | 524/403 |
| 2012/0267321 A1* | 10/2012 | Kisailus et al. | 210/748.09 |
| 2012/0286216 A1* | 11/2012 | Zhang | H01B 1/24 252/511 |
| 2013/0260114 A1* | 10/2013 | Saitou et al. | 428/207 |
| 2013/0280409 A1* | 10/2013 | Mushock et al. | 426/651 |
| 2013/0320270 A1* | 12/2013 | Hwang | H01M 4/364 252/503 |
| 2014/0350193 A1* | 11/2014 | Axelsson | A61K 49/12 525/417 |

* cited by examiner

POROUS METAL OXIDE AND METAL OXIDE-ORGANIC NANOCOMPOSITES, METHODS OF MAKING AND USES THEREOF

CROSS REFERENCE TO RELATED APPLICATIONS

This application claims priority under 35 U.S.C. §119 from Provisional Application Ser. No. 61/606,289, filed Mar. 2, 2012, the disclosure of which is incorporated herein by reference.

TECHNICAL FIELD

The disclosure provides relates to compositions and methods for water treatment, photovoltaics, solar hydrogen and other energy applications.

BACKGROUND

The rapid increase of technology and industry is causing new production chemicals and byproducts to be discharged into the wastewater system. These contaminants are now being found in ground and surface water, causing increased concern for the future supply of drinking water. The occurrences of emerging contaminants, which are just now being detected, with the advancement in measurement technologies, are causing increased concern for public health and safety. In order to protect the population and the environment new treatment technologies need to be developed that will not only remove these compounds but degrade them to non-harmful constituents.

In addition, world energy needs are placing higher demands on the development of inexpensive and efficient conversion technologies. Solar hydrogen production and photovoltaic applications offer potentially affordable and renewable routes to energy production.

SUMMARY

The disclosure provides a method comprising mixing a metal oxide precursor, metal sulfide precursor, metal selenide precursor, metal telluride precursor, metal nitride precursor, metal phosphide precursor, and/or metal arsenide precursor with a dispersing agent in a solvent at a desired pH under mild solution to hydrothermal conditions to promote nano- and/or micro-structure-dispersing agent composite formation at a desired size and/or geometry; and extruding the composite. In one embodiment, the method further comprises calcinating the composite at about 30-300° C. for about 1-72 hours to obtain nano- and/or micro-structure composite.

The disclosure also provides a method, comprising mixing a metal oxide precursor, metal sulfide precursor, metal selenide precursor, metal telluride precursor, metal nitride precursor, metal phosphide precursor, and/or metal arsenide precursor with a dispersing agent in a solvent at a desired pH under mild solution to hydrothermal conditions to promote nanomaterial-dispersing agent composite formation at a desired size and/or geometry; and calcinating the mixture at about 30-300° C. for about 1-72 hours to obtain nano- and/or micro-structure composite; and coating the nano- and/or micro-structure of a substrate.

In any of the foregoing embodiments, the methods can further comprise subjecting the composite to pyrolysis to partially or fully pyrolyze the dispersant material. In yet another embodiment of any of the foregoing the metal oxide precursor is selected from the group consisting of aluminum bis-ethylacetoacetate monoacetylacetonate, aluminum diacetylacetonate ethyl acetoacetate, aluminum monoacetylacetonate bis-propyl acetoacetate, aluminum monoacetylacetonate bisbutyl acetoacetate, aluminum monoacetylacetonate bishexyl acetoacetate, aluminum monoethyl acetoacetate bispropyl acetoacetonate, aluminum monoethyl acetoacetate bisbutyl acetoacetonate, aluminum monoethylacetoacetate bis-hexyl acetoacetonate, aluminum monoethylacetoacetate bisnonylacetoacetonate, aluminum dibutoxide monoacetoacetate, aluminum dipropoxide monoacetoacetate, aluminum butoxide monoethylacetoacetate, aluminum-s-butoxide bis(ethyl acetoacetate), aluminum di-s-butoxide ethylacetoacetate, aluminum-9-octadecenyl acetoacetate diisopropoxide, titanium allylacetoacetate triisopropoxide, titanium di-n-butoxide (bis-2,4-pentanedionate), titanium diisopropoxide (bis-2,4-pentanedionate), titanium diisopropoxide bis(tetramethylheptanedionate), titanium diisopropoxide bis(ethyl acetoacetate), titanium bis ammonium lactato dihydroxide (TiBALDH), titanium methacryloxyethylacetoacetate triisopropoxide, titanium oxide bis(pentanedionate), titanium salts such as titanium chloride and titanium sulfate, zirconium allylacetoacetate triisopropoxide, zirconium di-n-butoxide (bis-2,4-pentanedionate), zirconium diisopropoxide (bis-2,4-pentanedionate), zirconium diisopropoxide bis(tetramethylheptanedionate), zirconium diisopropoxide bis(ethylacetoacetate), zirconium methacryl icoxyethylacetoacetate triisopropoxide, zirconium butoxide (acetylacetate) (bisethylacetoacetate), and iron acetylacetonate. In yet another embodiment of any of the foregoing the metal oxide precursor is titanium bis ammonium lactato dihydroxide (TiBALDH). In yet another embodiment of any of the foregoing the dispersing agent is selected from phosphoglycerides; dioleylphosphatidyl ethanolamine (DOPE); dioleyloxypropyltriethylammonium (DOTMA); cholesterol; cholesterol ester; diacylglycerol; diacylglycerolsuccinate; diphosphatidyl glycerol (DPPG); hexanedecanol; fatty alcohols such as polyethylene glycol (PEG); polyoxyethylene-9-lauryl ether; a surface active fatty acid, such as palmitic acid or oleic acid; fatty acids; fatty acid amides; sorbitan trioleate (Span 85); polysorbate 80 (TWEEN-80); sodium cholate methyl cellulose; gelatin; surfactin; a poloxomer; a sorbitan fatty acid ester such as sorbitan trioleate; phosphatidylserine; phosphatidylinositol; phosphatidylethanolamine (cephalin); cardiolipin; phosphatidic acid; dicetylphosphate; dipalmitoylphosphatudylglycerol; stearylamine; dodecylamine; hexadecylamine; acetyl palmitate; glycerol ricinoleate; hexadecyl sterate; isopropyl myristate; tyloxapol; polyethylene glycol) 5000-phosphatidylethanolamine; polyvinyl alcohol (PVA); phospholipids; poloxamers, Poly(vinylphosphonic acid)Poly(acrylic acid), Poly(vinylsulfonic acid), Poly(methacrylic acid), poly(phosphonic acid) or any combinations thereof. In yet another embodiment of any of the foregoing the dispersing agent is polyvinyl alcohol. In yet another embodiment of any of the foregoing the solvent is a protic solvent. In yet another embodiment of any of the foregoing the pH is adjusted to between about 7.8 and 11. In yet another embodiment of any of the foregoing the metal oxide precursor is titanium bis ammonium lactato dihydroxide (TiBALDH) and the dispersing agent is polyvinyl alcohol. In yet another embodiment of any of the foregoing the ratio of TiBALDH to PVA is between about 1:50 and 1:100,000. In yet another embodiment of any of the foregoing the calcinations is carried out at about 150° C. In yet another embodiment of any of the foregoing the calcinations is performed in an autoclave. In yet another embodiment of any of the foregoing the substrate is a light transmitting material. In yet another embodiment of any of the foregoing the substrate is a fiber optic wire or tube. The disclosure provides a method comprising mixing a metal oxide precursor, metal sulfide precursor, metal selenide precursor, metal telluride precursor, metal nitride precursor, metal phosphide precursor, and/or metal arsenide precursor with a dispersing agent in a solvent at a desired pH under mild solution to hydrothermal conditions to promote nanomaterial-dispersing agent composite formation at a desired size and/or geometry; and calcinating the mixture at about 30-300° C. for about 1-72 hours to obtain a semi-conductive partial or fully porous nanoparticle-dispersant composite. In some embodiments, the composite is further processed to remove the dispersing material by pyrolyzing the composite.

Also provided are composites and nanomaterial preparations obtained by the methods of the disclosure having desired ratios of anatase and rutile as well as materials comprising anatase covalently linked to rutile.

The disclosure provides a method for the controlled synthesis of metal oxides (e.g., $TiO_2$) including size, phase, morphology and the like, and synthesis of metal oxide-organic bulk composites for various applications; water treatment, and energy conversion/production.

In one embodiment, the method uses control over Ti-precursor concentration, pH, and organic ligands that help in modification of $TiO_2$ size, phase, morphology, porosity and surface area. This process can be carried out under relatively mild conditions (e.g., temperatures between 25° C.-300° C., typically about 150° C.; pH between 0-14, depending on the Ti-precursor used; pressures of about 14-150 psi), but can be extended to more extreme conditions.

Also provided is a water treatment system comprising: a contaminated water inlet; a mixing chamber; $TiO_2$ nanoparticles; a source of UV or visible light; and a treated water outlet, wherein a contaminated water stream enter the mixing chamber through the contaminated water inlet and is mixed with the $TiO_2$ nanoparticles in the mixing chamber, exposing a solution comprising the nanoparticles and the contaminated water to an artificial or natural UV or visible light source, allowing the nanoparticles to sediment thereby removing the nanoparticles from the suspension and collecting treated water through the treated water outlet. In one embodiment, the system further comprises an acid chamber comprising an acidic solution for lowering the pH of the solution. In yet another embodiment, the system further comprises a base chamber comprising a basic solution for increasing the pH of sedimented nanoparticles. In another embodiment, the disclosure provides a method of producing bulk composite $TiO_2$-organic composite structures that can be fabricated and tailored to act as stand alone photocatalysts with high specific surface area, eliminating the need for nanoparticle recovery systems and thereby reducing processing costs.

The disclosure provides a method of treating contaminated water comprising exposing the contaminated water to a metal oxide that generates a hole in the valance band upon contact with UV or visible light wherein the hole generates OH.

The disclosure also provides methods of making and using metal oxide nanoparticles such as $TiO_2$ for photovoltaics and solar hydrogen production. In one embodiment, the metal oxide comprises other metals including, but not limited to, Ru, Ni, etc. and other metal oxides (e.g., ZnO, $Co_3O_4$, $ZrO_2$, $RuO_2$, $SnO_2$, $Al_2O_3$, etc.) and metal nitrides (e.g., AlN, BN, GaN, etc.), metal sulfides (e.g., CdS, ZnS), metal tellurides (e.g., $Bi_2Te_3$). Dopants that can be used include, but are not limited to, W, Ta, Nb, V, N, and S.

The disclosure provides a water treatment device comprising: a chamber having an inlet and an outlet; $TiO_2$ in the chamber; and means for exposing contaminated water in the chamber to UV or visible light. In one embodiment, the means for exposing the contaminated water to UV (or visible) light comprises a light source within the chamber or a window in a wall of the chamber that allows for transmission of UV (or visible) light external to the chamber. In yet another embodiment, the UV (or visible) light is natural or artificial. In yet a further embodiment, the $TiO_2$ comprises powder or nanoparticles. In one embodiment, the $TiO_2$ is bound to the walls of the chamber. In yet another embodiment, the $TiO_2$ is packed within the chamber between the inlet and the outlet.

The disclosure also provides a method of treating contaminated water comprising flowing contaminated water through the device in the preceding paragraph and exposing the contaminated water to UV (or visible) light while the contaminated water is in contact with the $TiO_2$.

In photovoltaic applications, the compositions of the disclosure can be used as stand alone bulk devices. In this embodiment, the bulk porous $TiO_2$ structures, for example, can be infiltrated with dye molecules (or quantum dots) as well as electrolytes or conducting polymers to afford flexible sensitized solar cells, negating the need for intensive, costly assembly (which includes growth on conducting, stiff and brittle glass). These conducting polymers that enable electron withdrawal from the $TiO_2$, could be subsequently coated with a radical scavenging material that would resist environmental degradation.

The details of one or more embodiments of the invention are set forth in the accompanying drawings and the description below. Other features, objects, and advantages of the invention will be apparent from the description and drawings, and from the claims.

DETAILED DESCRIPTION

As used herein and in the appended claims, the singular forms "a," "and," and "the" include plural referents unless the context clearly dictates otherwise. Thus, for example, reference to "a particle" includes a plurality of such particles and reference to "the material" includes reference to one or more materials and equivalents thereof known to those skilled in the art, and so forth.

Unless defined otherwise, all technical and scientific terms used herein have the same meaning as commonly understood to one of ordinary skill in the art to which this disclosure belongs. Although any methods and reagents similar or equivalent to those described herein can be used in the practice of the disclosed methods and compositions, the exemplary methods and materials are now described.

All publications mentioned herein are incorporated herein by reference in full for the purpose of describing and disclosing the methodologies, which are described in the publications, which might be used in connection with the description herein. The publications discussed above and throughout the text are provided solely for their disclosure prior to the filing date of the present application. Nothing herein is to be construed as an admission that the inventors are not entitled to antedate such disclosure by virtue of prior disclosure. Also, the use of "or" means "and/or" unless stated otherwise. Similarly, "comprise," "comprises," "comprising" "include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

$TiO_2$ is synthesized by various methods, such as chemical vapor deposition and thermal evaporation, which require high temperatures or extreme pressures to achieve the desired phase, shape, and size of the material. Solution routes such as chemical bath deposition, sol-gel and hydrothermal routes offer more environmentally friendly and lower cost processing. However, there is a lack of control of crystal size, phase, and morphology.

The disclosure provides compositions and methods for making composite materials, membranes and the like comprising a porous metal-oxide, -nitride, -sulfide, -selenide, -arsenide, -phosphide or -oxynitride structure or mechanically robust (elastic) composite materials consisting of a metal oxide structure (e.g., titanium dioxide, $TiO_2$ nanoparticles) that are cross-linked with polyvinyl alcohol (PVA) or any dispersant under mild temperatures (−40° C. to 250° C.) and neutral pH (6-8, but up to 11) within a variety of reaction vessels. The reaction involves dissolving a metal-oxide metal-oxide, -nitride, -sulfide, -selenide, -arsenide, -phosphide or -oxynitride precursor molecule with a dispersant (e.g., PVA) inside an autoclave reaction vessel and heating it to temperatures from about 25° C. to 400° C. for several minutes to a few days. The reaction enables the dispersant (e.g., PVA) to crosslink with the metal-oxide (e.g., $TiO_2$)-nitride, -sulfide, -selenide, -arsenide, -phosphide or -oxynitride precursor, which is concurrently being formed through a thermally enabled hydrolysis-condensation reactions. The resulting nano- or micro-structures can then be used to coat a substrate (e.g., a light conducting, transmitting or other material, glass, conductive polymers, non-conducting polymers, metals and the like) that is solid, porous or mesh-like.

Coating can be accomplished by, but not limited to, dip, drawn or spin-coating methods as well as other particle-deposition methods. Suitable substrates include meshes made of metals, ceramics, glass, and polymers; fiber optic materials that conduct any wavelength of light; optical conducting tubes that conduct any wavelength of light; solids such as glass, ceramics, metals, polymers of any geometry including films.

In one embodiment, the substrate can be a flexible material (e.g., a flexible membrane). In one embodiment, the product is a flexible composite comprising nanoporosity with crystalline nanoparticles of metal oxide, -nitride, -sulfide, -selenide, -arsenide, -phosphide or -oxynitride (or other semiconducting metal oxide with photocatalytic and photovoltaic capabilities) that can be formed under environmentally benign conditions (low temperatures, mild pH).

The substrate can be any geometry and material imaginable. For example, using the methods described herein one can grow $TiO_2$ nanostructures on: polymers, ceramics, metals, glasses. These substrates can be thin or thick films, particles, nanorods, tubes, plates, etc. The substrate does not have to be light conducting as an external source of light can be added. However, a combination of a light conducting (any and all wavelengths of the electromagnetic spectrum) substrate that is covered or coated with $TiO_2$ (film, particles, etc) will provide an ideal environment for an "all in one" photocatalytic membrane.

For example, a mesh of fiber optics can be coated with $TiO_2$ materials (again, as a film, particle, etc). These $TiO_2$ materials can be doped as needed. The hydrophilicity or hydrophobicity of either or both fiber optic and/or $TiO_2$ can be tuned to optimize photocatalytic activity by enabling a contaminant to get close enough to the $TiO_2$ to react with radicals produced during Photocatalysis. The mesh size of the fiber optics can be tuned to control the bulk porosity of the membrane, and by tuning the thickness of the $TiO_2$ coating, the porosity can be further reduced.

In addition, other metal oxides, nitrides, selenides, and the like (as described herein) can be used to coat a substrate (either alone or in combination with other materials) to enhance performance.

Besides using meshes to template the growth of photocatalytic (or photovoltaic, etc.) materials, nanomaterials such as wires, tubes, particles, and the like can be made without a template and used to fabricate membranes themselves. For example, if nanowires of $TiO_2$ were synthesized, these nanowires can be used to form a fibrous mesh that can act as a membrane itself (much like a large piece of cotton containing filaments of cotton).

The advantages of this process include: it is relatively inexpensive, can be scaled, and can be molded during the synthesis process. There are a variety of reactor geometries and styles that can be utilized to make these coated-composites. For example, the method includes coating substrates by, but not limited to, batch, semi-batch, plug-flow reactors (PFR), continuous stirred tank reactors (CSTR), drop cast reactors, tape casting, etc. All of these aforementioned reactors can accommodate synthesis of supports comprising a metal-oxide metal-oxide, -nitride, -sulfide, -selenide, -arsenide, -phosphide or -oxynitride nano- and/or micro-structure.

After coating or producing a composite material, the nano- and/or micro-structures can be transformed to amorphous or crystalline material by heating, drying, dehydration via solvent exchange, ion irradiation and the like. In addition, nanowires, nanorods or nanotubes can be made without a template and stacked on top of each other to form a mesh where the porosity is controlled by the size (e.g., diameter), stacking, orientation, and packing of structures.

The disclosure provides methods to generate metal-oxide metal-oxide, -nitride, -sulfide, -selenide, -arsenide, -phosphide or -oxynitride nano and/or micro-structures using simple processes that allow tunability of the resulting product. Although $TiO_2$ is demonstrated in the examples herein, the methodology can include other metal salt, metal-oxide, metal-nitride, metal-sulfide, metal arsenide, metal phosphide, and metal telluride materials including, but not limited to, Ru, Ni, ZnO, $Co_3O_4$, $ZrO_2$, $RuO_2$, $SnO_2$, $Al_2O_3$, AlN, BN, GaN, CdS, ZnS, AlAs, GaAs, InP, $Bi_2Te_3$ or any combination of inorganic compounds. Dopants may also be included in the methods to modify the band gap of a resulting product.

Nano- and/or micro-materials of the disclosure can be derived from various metal precursor materials including, for example, oxides, nitrides, sulfides, tellurides, phosphide, arenides, and selenides of elements from columns 2-15 of the Periodic Table. Specific compounds that may be used as nanomaterials include, but not limited to, those set forth in Table 1 as well as aluminum cerium oxide, aluminum arsenide, aluminum nitride, aluminum oxide, aluminum titanate, antimony(III) oxide, antimony tin oxide, bismuth cobalt zinc oxide, bismuth(III) oxide, bismuth telluride, cerium(IV) oxide, cerium(IV) zirconium(IV) oxide, chromium(III) oxide, cobalt aluminum oxide, cobalt(II, III) oxide, copper aluminum oxide, copper iron oxide, copper(II) oxide, copper (I) oxide, copper zinc iron oxide, dysprosium (III) oxide, erbium(III) oxide, europium(III) oxide, gallium nitride, gallium oxide, holmium(III) oxide, indium (III) oxide, indium phosphide, indium tin oxide, iron(II, III) oxide, iron nickel oxide, iron(III) oxide, lanthanum(III) oxide, lead telluride, magnesium oxide, manganese(II) titanium oxide, nickel chromium oxide, nickel cobalt oxide, nickel(II) oxide, nickel zinc iron oxide, praseodymium(III, IV) oxide, samarium(III) oxide, silicon, germanium, strontium ferrite, tantalum oxide, terbium (III, IV) oxide, tin(IV) oxide, titanium carbonitride, titanium(IV) oxide, titanium silicon oxide, tungsten (VI) oxide, ytterbium(III) oxide, ytterbium iron oxide, yttrium(III) oxide, zinc oxide, zinc titanate, and zirconium(IV) oxide.

In a certain embodiment, using the size and/or morphology controlled nano- and/or micro-structure synthesis process disclosed herein results in structures that are uniform in size and/or morphology. In yet another embodiment, using the process disclosed herein results in nanostructures that are nanoparticles. In a further embodiment, using the process disclosed herein results in nanostructures that are prism-shaped. In yet a further embodiment, using the process disclosed herein results in nanostructures that are belt-shaped. In a certain embodiment, using the process disclosed herein results in nanostructures that are cube-shaped. In a certain embodiment, using the process disclosed herein results in nanostructures that are rod-shaped (e.g., wires).

In a particular embodiment, using the size and/or morphology controlled structure synthesis process disclosed herein results in structures having a near uniform size distribution. In a certain embodiment, using the process disclosed herein results in structures that are less than 100 μM in diameter/cross-section. In yet another embodiment, using the process disclosed herein results in structures that are less than 10 μM in diameter/cross-section. In another embodiment, using the process disclosed herein results in structures that are less than 1 μM in diameter/cross section. In a certain embodiment, using the process disclosed herein results in nanostructures that are less than 400 nM in diameter/cross-section.

In a particular embodiment, a structure disclosed herein is a prism of 1 μm×100 nm. In another embodiment, a structure disclosed herein is a nano-particles of 25 nm. In yet another embodiment, a nanostructure disclosed herein is a 100 nm

TABLE 1

| Types of Semiconducting Materials | Example of Semiconding Materials | Example Precursors |
| --- | --- | --- |
| Metal-oxides | Titanium Dioxide, Zinc Oxide, Copper(I) oxide, Copper(II) oxide, Tin dioxide, Uranium dioxide | Titanium(IV) butoxide, Titanium(IV) bis(ammonium lactato)dihydroxide, Titanium(IV) bis(ammonium lactato)dihydroxide, Titanium(IV) isopropoxide, Titanium (IV) chloride, Zinc chloride, Zinc cyclohexanebutyrate, Zinc nitrate, Zinc sulfide |
| Metal-nitrides | Aluminium nitride, boron nitride, gallium nitride, indium nitride | Tris(diethylamino)gallium(III), Gallium(III) acetylacetonate, Gallium(III) tris(2,2,6,6-tetramethyl-3,5-heptanedionate) |
| Metal-sulfides | Molybdenum disulfide, Tin sulfide, bismuth sulfide, Copper zinc tin sulfide | Copper(II) acetylacetonate, Copper(II) acrylate, Copper(I) chloride, Tin(IV) tert-butoxide, Tin(IV) bis(acetylacetonate) chloride, Tin(IV) tert-butoxide |
| Metal-tellurides | Lead manganese telluride, Cadmium telluride, Zinc Telluride | Lead nitrate, zinc nitrate, Zinc(II) arene tellurolato, Cadmium nitrate, Cadmium orthophosphate, Cadmium 2,4-pentanedionate |
| Metal-phospides | Boron phospide, gallium phospide, Indium, phosphide, | Tris(diethylamino)gallium(III), Gallium(III) acetylacetonate, Gallium(III) tris(2,2,6,6-tetramethyl-3,5-heptanedionate), phosphine |
| Metal-arenides | boron arsenide, gallium arsenide, indium arsenide | Tris(diethylamino)gallium(III), Gallium(III) acetylacetonate, Gallium(III) tris(2,2,6,6-tetramethyl-3,5-heptanedionate), trimethylarsine |
| Metal-selenide | Arsenic selenide, Cadmium selenide, Ninc selenide, | trimethylarsine, Cadmium nitrate, Cadmium orthophosphate, Cadmium 2,4-pentanedionate |

As used herein, "nano-structure" refers to a structure of any geometry having dimensions that are less than 1,000 nanometers, and in particular having a size range of about 2 to about 500 nanometers. The nanostructure can be any shape such as spheroid, prism, rod, conical or cuboid. In some embodiments, the nanostructure has a spheroidal shape. A "micro-structure" refers to a structure of any geometry having dimensions that are greater than 1,000 nanometers, and in particular having a size range of about 1 to several micrometers. The microstructure can be any shape such as spheroid, prism, rod, conical or cuboid. In some embodiments, the microstructure has a spheroidal shape.

nanocube. In a certain embodiment, a structure disclosed herein is 10 μm×400 nm×20 nm belts.

In various embodiments, a nano- and/or micro-structure is provided comprising any one or more Group 2 or 3 atoms, or transition or rare earth atoms, such as scandium, yttrium, lanthanum, actinium, or cerium or another lanthanide. In certain embodiments, the material comprises any Group 4 atom such as titanium or zirconium. In particular embodiments, the nano- and/or micro-structure comprises an oxide of any Group 2, Group 3 element and/or an oxide of any Group 4 element. In general, a nano- and/or micro-material of the disclosure can comprise any combination of one or more Group 2 or 3 atoms, or rare earth atoms, and/or any Group 4 atom.

In some embodiments, the nano- and/or micro-material comprises a metal, usually in the form of a metal particle. Examples of metals include, but are not limited to, Ni, Ru, and alloys thereof. With some embodiments, the material comprises a metal oxide such as $RuO_2$, $CuO_2$, $ZrO_2$, $TiO_2$, $Al_2O_3$, $CeO_2$, $Nb_2O_5$ or $MnO_2$. In particular embodiments, the metal or metal oxide is a metal catalyst such as Au, Pd, Pt, Ru, Ti, $TiO_2$, or $RuO_2$.

The compositions of the disclosure can comprise homogenous nanoparticles, mixtures of two or more different metal nano- and/or micro-structures (e.g., a heterogeneous mixture) and/or may comprise nano- and/or micro-structures wherein two or more metals are present in a single nano- and/or micro-structures, for example, in the form of an alloy or a mixture of these metals. Non-limiting examples of alloys include Ag/Au, Ag/Ni, Ag/Cu, Pt/Cu, Ru/Pt, Au/Pt and Ag/Co.

The disclosure also provides a method to generate a nano- and/or micro-structures composition of the disclosure comprising Group 2, group 2 and Group 3 or Group 3 and Group 4 metals, metal-oxides, metal-sulfides, metal-arsenides, metal-phosphides, metal-tellurides and metal-nitrides, and in particular titanium oxide nanomaterials. This method allows for a number of parameters to be tuned independently such as, for example, the size, shape, porosity and/or composite composition.

The disclosure also provides a method for the formation of nano- and/or micro-structures comprising a Group 2, Group 2 and Group 3, Group 3 or Group 3 and Group 4 oxides. In one embodiment, the disclosure provides a method of making a titanium oxide nano- and/or micro-structures. The nano- and/or micro-structures can be tuned in diameter from about 1 to several micrometers. These nano- and/or micro-structures are therefore highly stable with a high degree of material tunability.

Generally, the method of the disclosure comprises mixing a precursor material with a dispersing agent under mild conditions in a desirable pH and allowing the reaction to proceed at room temperature or under mild heat conditions to from a composite having nano- and/or micro-structures in a matrix of dispersing agent.

Dispersing agents useful in the disclosure comprise materials that serves to control growth by controlling diffusion of ions, serve to modify or control the shape of a nanoparticle and/or promotes cross-linking between metal particles to form a composite material. Numerous dispersing agents are known in the art. Such dispersing agents include various polymers. For example, dispersing agents that comprises one or more heteroatoms which are available for hydrogen bonding, ionic interactions, etc. (such as, e.g., O and N) can be used.

Various dispersing agents are used in the methods of the disclosure. For example, a metal oxide precursor can be dispersed in a dispersing agents selected from the group consisting of general carbon-backbone based polymers with pendant groups including, but not limited to hydroxyls, carboxylates, phosphates, sulfates, amines. In addition, polymers such as the following can be used: phosphoglycerides; dioleylphosphatidyl ethanolamine (DOPE); dioleyloxypropyltriethylammonium (DOTMA); cholesterol; cholesterol ester; diacylglycerol; diacylglycerolsuccinate; diphosphatidyl glycerol (DPPG); hexanedecanol; fatty alcohols such as polyethylene glycol (PEG); polyoxyethylene-9-lauryl ether; a surface active fatty acid, such as palmitic acid or oleic acid; fatty acids; fatty acid amides; sorbitan trioleate (Span 85); polysorbate 80 (TWEEN-80); sodium cholate methyl cellulose; gelatin; surfactin; a poloxomer; a sorbitan fatty acid ester such as sorbitan trioleate; phosphatidylserine; phosphatidylinositol; phosphatidylethanolamine (cephalin); cardiolipin; phosphatidic acid; dicetylphosphate; dipalmitoylphosphatudylglycerol; stearylamine; dodecylamine; hexadecylamine; acetyl palmitate; glycerol ricinoleate; hexadecyl sterate; isopropyl myristate; tyloxapol; polyethylene glycol) 5000-phosphatidylethanolamine; polyvinyl alcohol (PVA); phospholipids; poloxamers, Poly (vinylphosphonic acid), Poly(acrylic acid), Poly(vinylsulfonic acid), Poly(methacrylic acid), poly(phosphonic acid) or any combinations thereof. In one embodiment, titanium bis ammonium lactato dihydroxide (TiBALDH) is dispersed in a neutral or protic solvent comprising PVA.

Any suitable method and device and combinations thereof can be used for calcination, e.g., heating in a furnace or on a hot plate, irradiation with a light source (UV or visible lamp, IR or heat lamp, laser, etc.), an autoclave, combinations of any of these methods, to name just a few. Also, one or more of these steps may optionally be carried out in a reducing atmosphere (e.g., in an $H_2/N_2$ atmosphere for metals that are prone to undergo oxidation, especially at elevated temperature, such as e.g., Ni) or in an oxidizing atmosphere.

Various solvents can be used in the methods of the disclosure. The selection of solvent will depend upon and can be empirically determined by one of skill in the art. Selection will depend upon the type of precursor compound used in the formation of a nano- and/or micro-structures. In some embodiments, it is advantageous for the solvent for mixing the dispersing agent and precursor material comprise one or more polar solvents and, in particular, protic solvents. For example, the vehicle may comprise a mixture of at least two protic solvents, or at least three protic solvents. Non-limiting examples of such protic solvents include alcohols (e.g., aliphatic and cycloaliphatic alcohols having from 1 to about 12 carbon atoms such as, e.g., methanol, ethanol, n-propanol, isopropanol, 1-butanol, 2-butanol, sec-butanol, tert-butanol, the pentanols, the hexanols, the octanols, the decanols, the dodecanols, cyclopentanol, cyclohexanol, and the like), polyols (e.g., alkanepolyols having from 2 to about 12 carbon atoms and from 2 to about 4 hydroxy groups such as, e.g., ethylene glycol, propylene glycol, butylene glycol, 1,3-propanediol; 1,3-butanediol, 1,4-butanediol, 2-methyl-2,4-pentanediol, glycerol, trimethylolpropane, pentaerythritol, and the like), polyalkylene glycols (e.g., polyalkylene glycols comprising from about 2 to about 5 $C_{2-4}$ alkylene glycol units such as, e.g., diethylene glycol, triethylene glycol, tetraethylene glycol, dipropylene gycol, tripropylene glycol and the like) and partial ethers and esters of polyols and polyalkylene glycols (e.g., mono($C_{1-6}$ alkyl)ethers and monoesters of the polyols and polyalkylene glycols with $C_{1-6}$ alkanecarboxylic acids, such as, e.g., ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, diethylene glycol monopropyl ether and diethylene glycol monobutyl ether (DEGBE), ethylene gycol monoacetate, diethylene glycol monoacetate, and the like).

Any aprotic organic solvent can be used in the methods of the disclosure. These aprotic organic solvents may include solvents such as dioxane, dimethylformamide, dimethylacetamide, sulfolane, N-methylpyrrolidine, dimethylsulfone, dichloroethane, trichloroethane, and freons, or solvents such as dichloromethane, acetonitrile, and tetrahydrofuran.

In an aprotic solvent environment, oxide surfaces have a common feature, namely abundant permanent dipoles on their surface, which means that they adsorb charged, polar, and highly polarizable species, such as metal nano- and/or micro-structures, through dipole-charge, dipole-dipole, and dipole-induced dipole interactions, respectively.

In view of the interaction between the solvent and the dispersing agent, the most advantageous solvent is in one aspect a function of the nature of the dispersing agent. For example, a dispersing agent that comprises one or more polar groups such will advantageously be combined with a vehicle which comprises (or predominantly consists of) one or more polar components (solvents) such as, e.g., a protic solvent, whereas a dispersing agent that substantially lacks polar groups will typically be combined with a vehicle which comprises, at least predominantly, aprotic, non-polar components.

The ratio of precursor and dispersing agent can vary over a wide range (see, e.g., Table 2). The ratio depends on factors such as the nature of the dispersing agent (polymer, molecular weight, etc.).

TABLE 2

| PVA:Ti | Molecular Weight (optimal) | Other MW |
| --- | --- | --- |
| 1:1 | 9,500 | 40,500; 150,000 |
| 1:10 | 9,500 | 40,500; 150,000 |
| 1:100 | 40,500 | 9,500; 150,000 |
| 1:1,000 | 40,500 | 9,500; 150,000 |
| 1:10,000 | 40,500 | 9,500; 150,000 |
| 1:100,000 | 40,500 | 9,500; 150,000 |

Using embodiments of the disclosure nano- and/or microstructures composites comprising a metal nano- and/or micro-structures or a semi-conductive nano- and/or microstructures dispersed in a polymerized dispersing agent are obtained. The composite material may be partially (e.g. 0.1-990), substantially or fully pyrolyzed to remove the dispersant and leave only the nanoparticles by heating between 20° C. to 1000° C. The composite and nano- and/or micro-structures obtained by the methods of the disclosure comprise anatase particles covalently linked to rutile particles.

For example, to generate the desired nano- and/or microstructures, laser pyrolysis is used either alone or in combination with additional processing. Specifically, laser pyrolysis is a process for efficiently producing suitable semiconductive particles with a narrow distribution of average particle diameters. Other methods of pyrolysis are known in the art and can be used in the methods described herein.

The disclosure provides a process for the production of nano- and micro-catalytic materials, energy storage and solar cell materials as well as compositions comprising such materials. The process disclosed herein controls the deposition size and/or shape of deposited crystals in a facile one-step process. The method to make the nano- and/or micro-structures disclosed herein comprises preparing a solution comprising a first metal salt with a solution comprising a second metal salt. The method may further comprise one or more pH adjustment steps, polymer addition steps, and/or purification steps. The method disclosed herein, involves dissolving a first metal salt in a solvent, dissolving a second metal salt, combining the dissolved metal salts to form a reaction mixture, and then heating the reaction mixture for a period of time (e.g., from about 2 seconds to several hours; from about 2 seconds to 48 hours, 2-24 hours, 2-10 hours, 5-10 hours, 2-4 hours and any range or numerical value of any of the foregoing). The method disclosed herein, may further comprise steps to adjust the pH of the solutions, steps to add polymers to the solutions or reaction mixture and/or add steps for purifying the resulting nano- and/or microstructures. Choice of the solvent/co-solvent systems, addition of specific polymers, and modifying the pH of the solutions, enables size and morphological control of the resulting structures. Using the method disclosed herein, one can obtain various compositions (e.g., $TiO_2$, lithium-iron phosphate nanocrystals and the like) with a controlled range of size and shapes that can then be applied to various substrates. Advantages of the method disclosed herein include, but are not limited to: (i) precise control of the shape and/or size of the deposited structures, (ii) the structures produced can be used in or on light conductive materials, (iii) it is a relatively inexpensive method, and (iv) it can be easily scaled up for industrial production based on the potential for continuous processing.

The size and/or shape of the crystals can be controlled through the synthesis and deposition process disclosed herein comprising dissolving a first metal salt in one or more solvents. In a particular embodiment, the first metal salt comprises a metal that is an alkali metal, alkaline earth metal, transition metal, post-transition metal, or lanthanide. In a further embodiment, the first metal salt comprises a metal that is a transition metal. In a yet further embodiment, the first metal salt comprises a metal selected from the group comprising, manganese, iron, titanium, zinc, copper, cobalt and nickel.

In another embodiment, the first metal salt comprises either a polyatomic anion or monoatomic anion. In a further embodiment, the first metal salt comprises a polyatomic anion and/or monoatomic anion selected from the group comprising sulfate, nitrate, phosphate, halide, dihydrogen phosphate, acetate, hydrogen sulfite, hydrogen sulfate, hydrogen carbonate, nitrite, cyanide, hydroxide, permanganate, hypochlorite, chlorate, perchlorate, hydrogen phosphate, oxalate, sulfite, carbonate, chromate, dichromate, silicate, molybdate, phosphite, diethyl carbonate, tetrafluoroborate, hexafluorophosphate, and triflate. In yet another embodiment the first metal salt comprises a polyatomic anion selected from the group comprising phosphate, sulfate, nitrate, molybdate, oxalate, chlorate, and carbonate. In a certain embodiment the first metal salt comprises a polyatomic anion that is either sulfate, or phosphate. In yet another embodiment the first metal salt comprises a polyatomic anion that is a sulfate.

In a particular embodiment, the first metal salt is dissolved in one or more solvents. In another embodiment, the first metal salt is dissolved in one or more polar solvents. In a further embodiment, the first metal salt is dissolved in one or more aqueous and/or non-aqueous solvents. In a further embodiment, the first metal salt is dissolved in one or more polar solvents comprising water, dihydroxy alcohols, alcohols, acetic acid, formic acid, ethyl acetate, tetrahydrofuran, dichloromethane, acetone, acetonitrile, dimethylformamide, dimethyl sulfoxide, and the like. In a further embodiment, the first metal salt is dissolved in mixture of solvents. In yet a further embodiment, the first metal salt is dissolved in water and/or a glycol, such as triethylene glycol (TEG). In a certain embodiment, the first metal salt is dissolved in water and TEG, wherein this water/TEG mixture can range from almost 99.9% water to almost 99.9% TEG with specific volumetric ratios in between depending on desired product.

The size and/or morphology controlled nanostructure synthesis process disclosed herein comprises forming a reaction mixture comprising combining a solution comprising a first metal salt with a solution comprising a second metal salt.

As mentioned above, various dispersing agents and solvents can be used and empirically identified based upon the metal salt being used.

Figure 9:
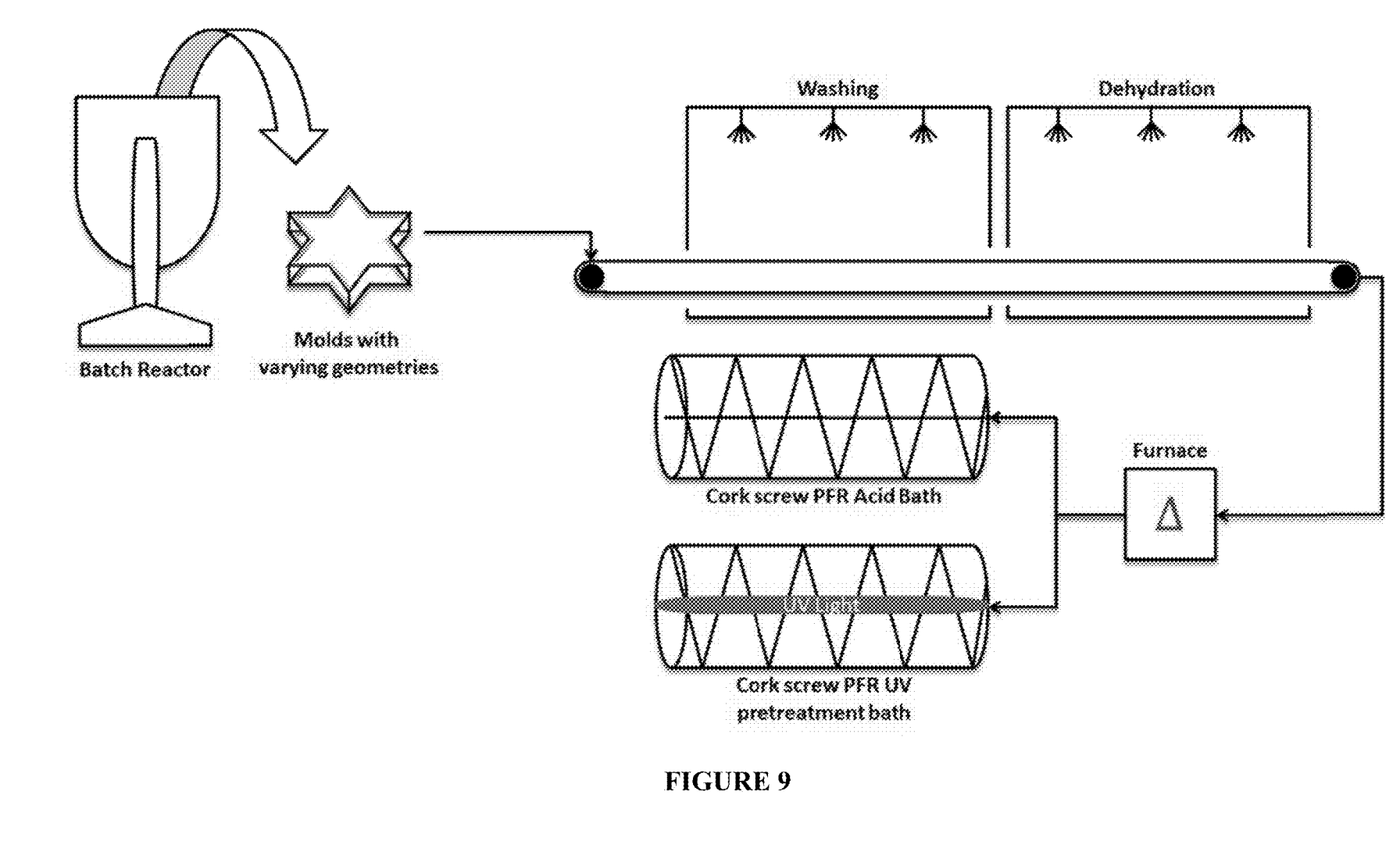
FIG. 9 is a sample continuous reactor process schematic.

A process for the fabrication of $TiO_2$ nanomaterials according to one embodiment is outlined in FIGS. 9 and 10. As shown in FIG. 9, a titanium oxide precursor is reacted with $2NH_4^+$ at a typical pH of 7.8-11 (although a pH of 1-14 is usable) for 1-72 hours at 150° C. The titanium oxide precursor material is dispersed in an aqueous solution by stirring or sonication and then loaded into a Teflon-lined stainless steel autoclave vessel and heated to about 150° C. for about 1 to about 72 hours to nucleate and grow $TiO_2$ nano- and/or micro-particles through hydrolysis and condensation.

In FIG. 10, a method of generating tunable metal oxides-organic composite is depicted. As shown in FIG. 10, soluble Ti precursor (Titanium bis ammonium lactato dihydroxide (TiBALDH, 50 wt %)) are reacted under conditions for the desired growth of titanium dioxide ($TiO_2$) nano- and/or micro-particles through the addition of a polymer, polyvinyl alcohol (PVA; MW~41500), under mild temperatures (150° C.) and neutral pH within a sealed reaction vessels. The pH can be adjusted using ammonium hydroxide. The reactor is then sealed and heated to a temperature of greater than about 100° C. (e.g., about 150° C.) for 1-72 hours (e.g., 12 to 72 hours) to nucleate and grow $TiO_2$ nano- and/or micro-particles through hydrolysis and condensation. Various extremes of the temperature and length of reaction can be used. For example, the lower the temperature the longer the reaction time. Accordingly, a temperature range of about 25-300° C. can be used and the reaction period can be from several hours to several months depending upon the temperature. The reaction produces metal oxide-polymer composite consisting of crystalline $TiO_2$ micro- and/or nanostructure that are tuned to the desired size, specific surface area, and phase ratios (anatase:rutile) that is needed for a specific applications (e.g., photocatalytic reactions, photovoltaic cells and the like). For example, the concentration of the polymer or dispersing agent can also be adjusted with more polymer or dispersing agent increasing the porosity of the final product to very little polymer resulting in a powder instead of the bulk $TiO_2$-organic composite. Alternative MW PVA polymers can be used as well as other functionalized polymers (e.g., polyaspartic acid). This fabrication of a composite $TiO_2$-organic material is advantageous as it can be fabricated and tailored to act as stand alone photocatalysts, eliminating the need for nanoparticle recovery systems, thereby reducing processing costs.

After the reaction, the product is removed from the reactor and can be washed in water to remove by-products and unreacted precursors and then dried using critical point drying or drying oven. The pH does not have to be modified, although increasing the pH to 9 or greater increases the rate of hydrolysis of the precursor thereby controlling the resulting phase and crystallite size. The reaction temperature is not critical although a minimum of 50° C. should be used to enable hydrolysis and condensation. The concentration of the polymer can also be adjusted with more polymer to increase the porosity of the final product or to very little polymer resulting in a powder instead of the bulk composite.

The reactor can be scaled to smaller or larger volumes, only limited by the cost to manufacture these reactors. It also may be possible to carry out these reactions in non-sealed reactors equipped with condensers to minimize evaporation and if the proper chemistry (e.g., pH, temperature) and time will afford the necessary hydrolysis and condensation reactions. In addition to organic additives to the synthesis process dopants can be added to reduce the band gap thereby increasing the efficiency of the material when employing solar light instead of UV-light.

As mentioned above, these reactions are not limited to $TiO_2$ and can be modified with other metal materials (Au, Pd, Pt, Ru, Ni, etc.), metal oxides (ZnO, $Co_3O_4$, $ZrO_2$, $RuO_2$, $SnO_2$, $Al_2O_3$), metal nitrides (AlN, BN, GaN), metal sulfides (CdS, ZnS), metal arsenides (GaAs), metal phosphides (InP), or any combination of inorganic compounds. Dopants including, but not limited to, W, Ta, V, N, and S can be added to modify the band gap. The solvent does not have to be water. Non-aqueous based solvents (e.g., alcohols, ethers, etc.) can be utilized to synthesize materials that would otherwise not form under aqueous conditions. In addition, the polymer can be modified to one that cross-links metals, metal nitrides, metal carbides, etc. The polymer can also be modified to be electrically conducting, allowing the production of electronic and optoelectronic devices.

Furthermore, various metal oxide precursors can be used in the methods including those selected from the group consisting of aluminum bis-ethylacetoacetate monoacetylacetonate, aluminum diacetylacetonate ethyl acetoacetate, aluminum monoacetylacetonate bis-propyl acetoacetate, aluminum monoacetylacetonate bisbutyl acetoacetate, aluminum monoacetylacetonate bishexyl acetoacetate, aluminum monoethyl acetoacetate bispropyl acetoacetonate, aluminum monoethyl acetoacetate bisbutyl acetoacetonate, aluminum monoethylacetoacetate bis-hexyl acetoacetonate, aluminum monoethylacetoacetate bisnonylacetoacetonate, aluminum dibutoxide monoacetoacetate, aluminum dipropoxide monoacetoacetate, aluminum butoxide monoethylacetoacetate, aluminum-s-butoxide bis(ethyl acetoacetate), aluminum di-s-butoxide ethylacetoacetate, aluminum-9-octadecenyl acetoacetate diisopropoxide, titanium allylacetoacetate triisopropoxide, titanium di-n-butoxide (bis-2,4-pentanedionate), titanium diisopropoxide (bis-2,4-pentanedionate), titanium diisopropoxide bis(tetramethylheptanedionate), titanium diisopropoxide bis(ethyl acetoacetate), titanium methacryloxyethylacetoacetate triisopropoxide, titanium oxide bis(pentanedionate), titanium salts such as titanium chloride, titanium sulfate; titanium butoxide, titanium bis lactato dihydroxide, zirconium allylacetoacetate triisopropoxide, zirconium di-n-butoxide (bis-2,4-pentanedionate), zirconium diisopropoxide (bis-2,4-pentanedionate), zirconium diisopropoxide bis(tetramethylheptanedionate), zirconium diisopropoxide bis(ethylacetoacetate), zirconium methacryl icoxyethylacetoacetate triisopropoxide, zirconium butoxide (acetylacetate) (bis-ethylacetoacetate), and iron acetylacetonate. The precursor ligands can be tuned to provide control of hydrolysis reactions in this process.

The resulting material is advantageous for photocatalytic, photovoltaic and solar hydrogen applications because of the phase, crystallite size, porosity, and surface area are easily tunable using synthesis parameters to optimize for the appropriate application. This composite photocatalyst is also advantageous because the material maintains a high surface to maximize efficiency while being a bulk composite that is easily retained or recovered from the effluent stream.

The resulting nano- and/or micro-structures can then be coated on a desired substrate. For example, the substrate can comprise fiber-optic material, light transducing material, wires, polymer membranes, glass or any other suitable substrate. Fiber optic materials are particularly useful to transmit light energy to the catalytic nano- and/or microstructures produced by the methods of the disclosure. In this way, the fiber optic material can be used in water treatment tanks away from the light and the light energy can be transmitted to the catalytic nano- and/or microstructure material.

Figure 1:
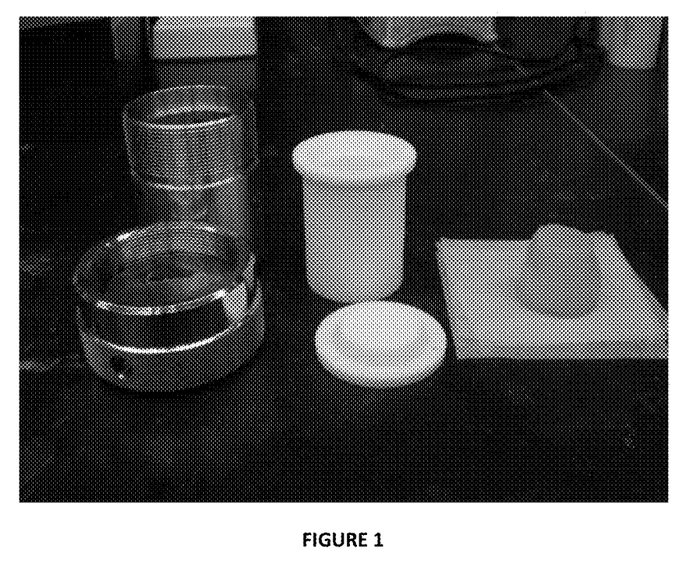
FIG. 1 shows an experimental apparatus (left to right: stainless steel autoclave, Teflon® liner, TiO2-PVA composite).
Figure 2:
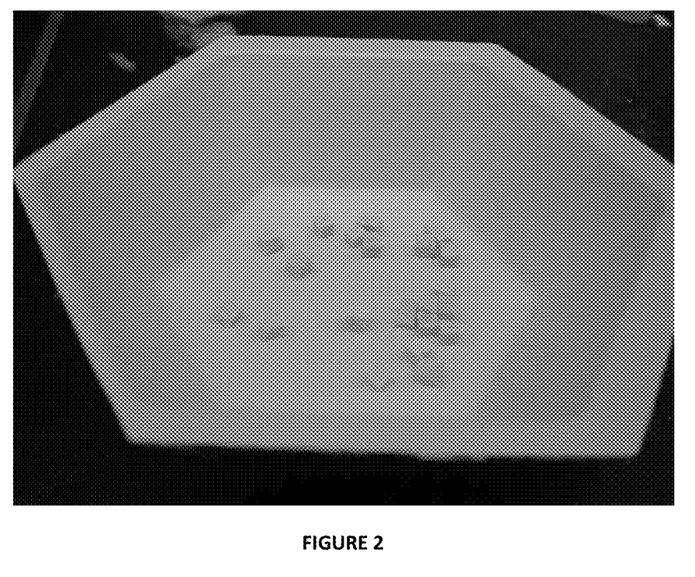
FIG. 2. Critically point dried cubes of Ti02-PVA
Figure 3:
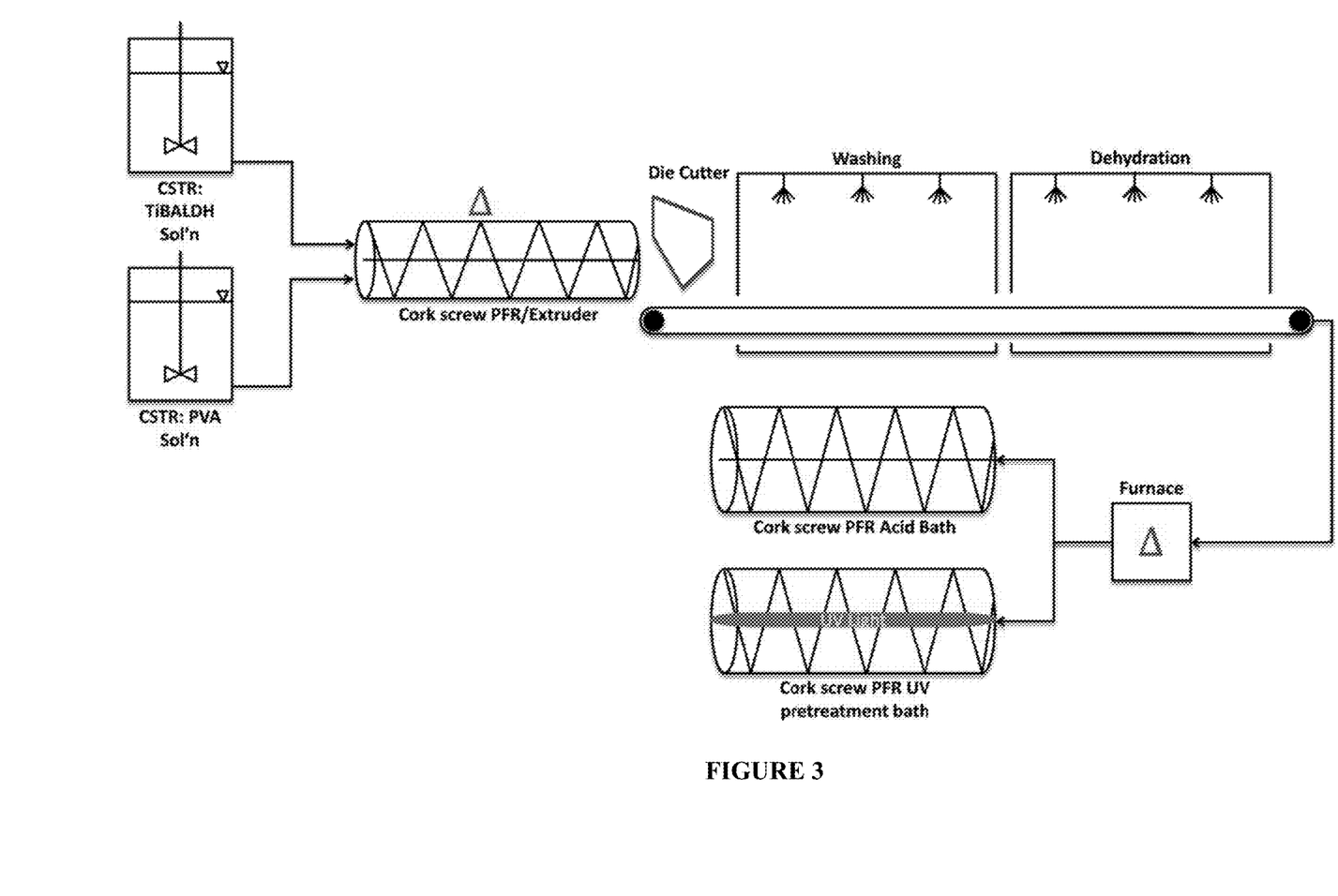
FIG. 3 is a sample continuous reactor process schematic.
Figure 4:
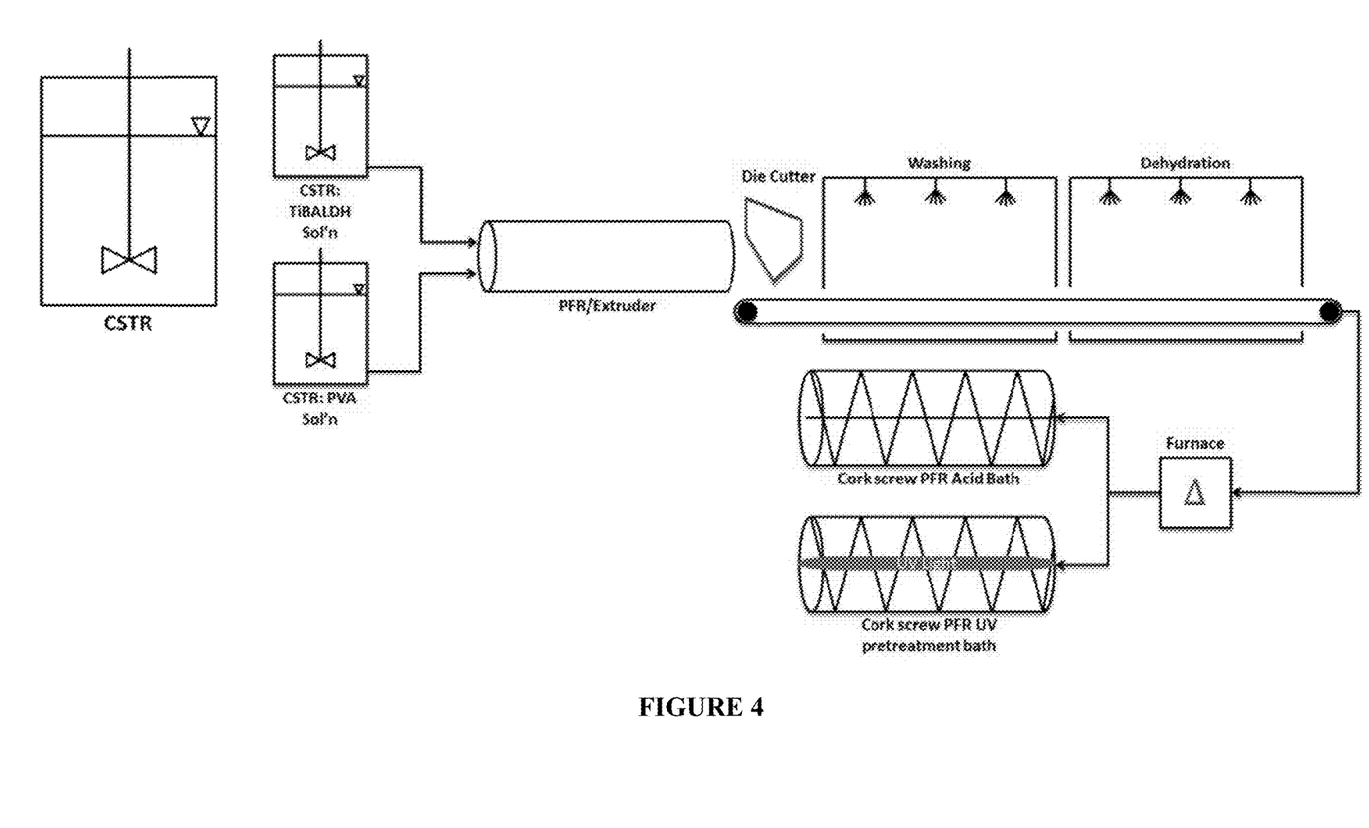
FIG. 4 is a sample continuous reactor process schematic.
Figure 5:
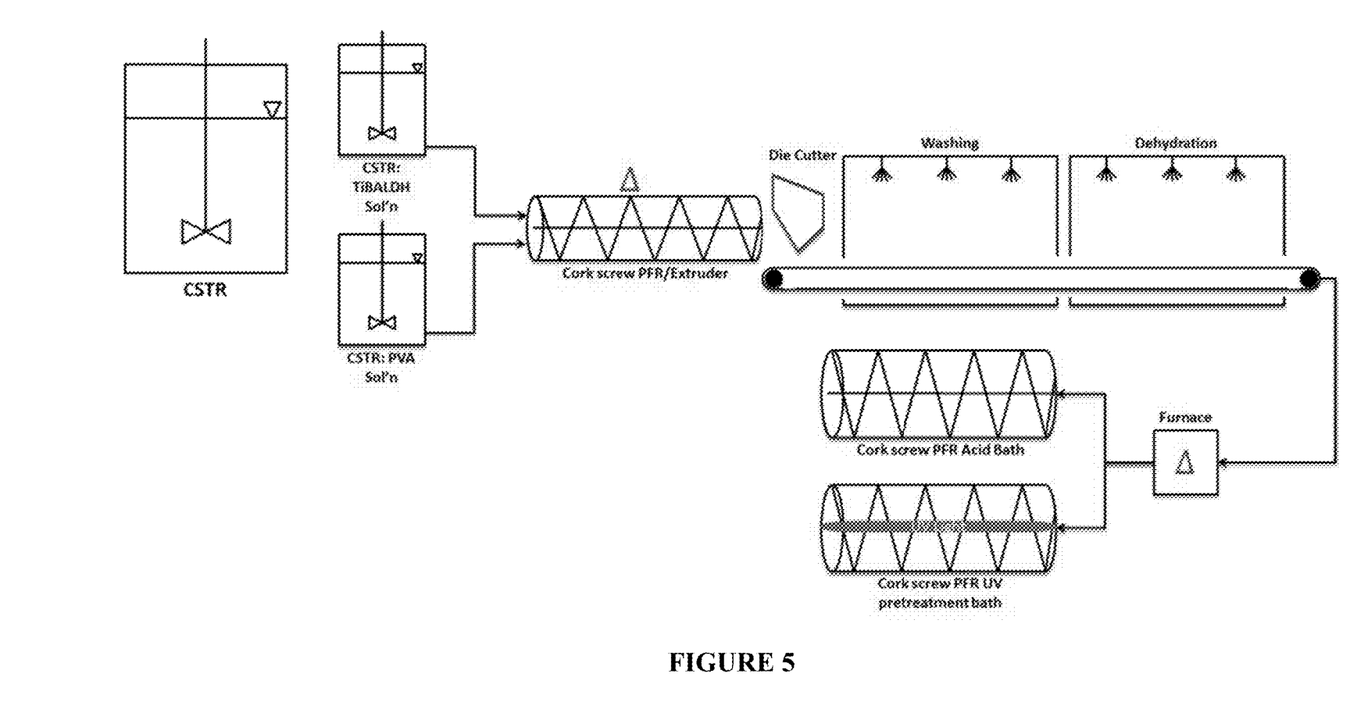
FIG. 5 is a sample continuous reactor process schematic.
Figure 6:
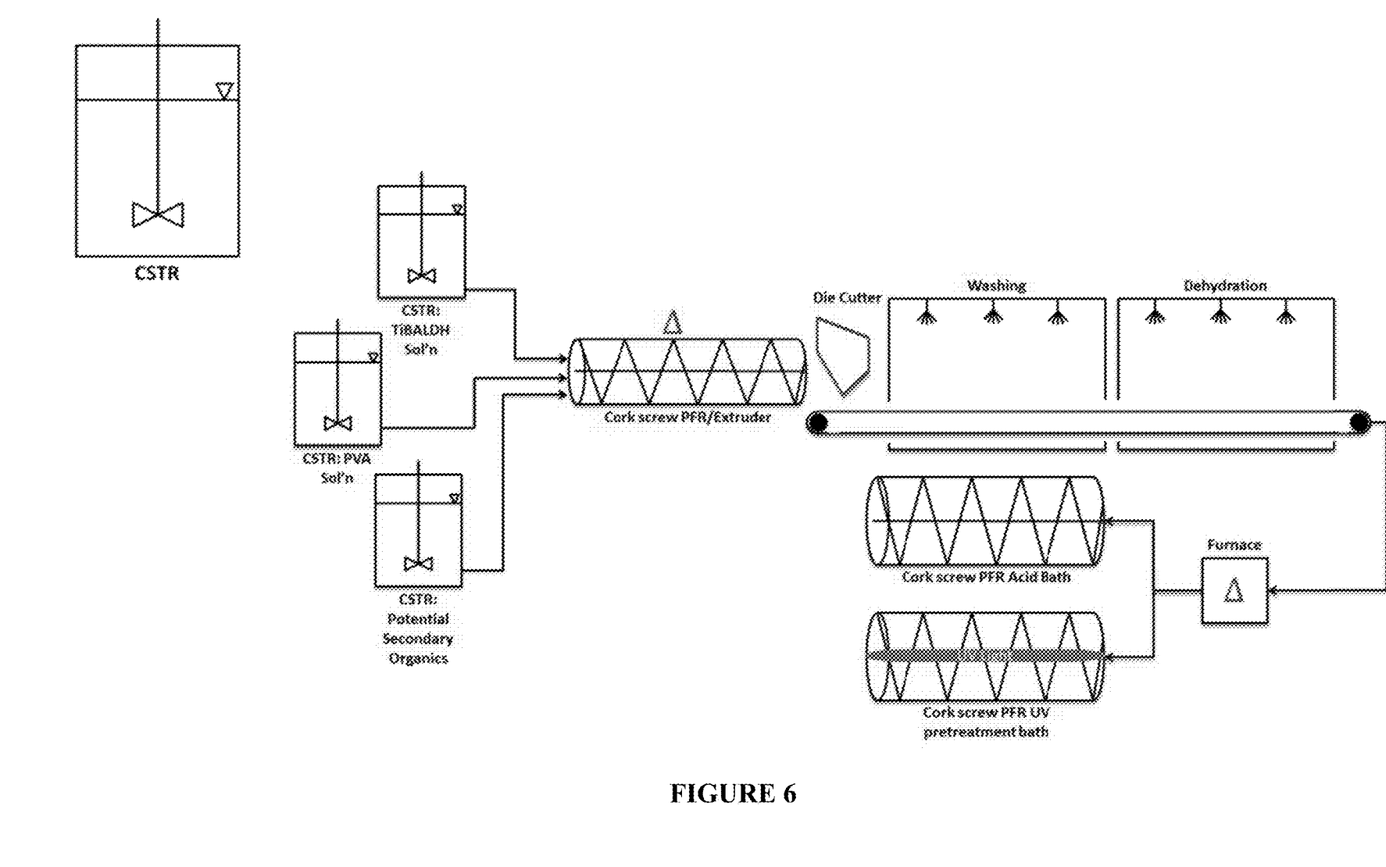
FIG. 6 is a sample continuous reactor process schematic.
Figure 7:
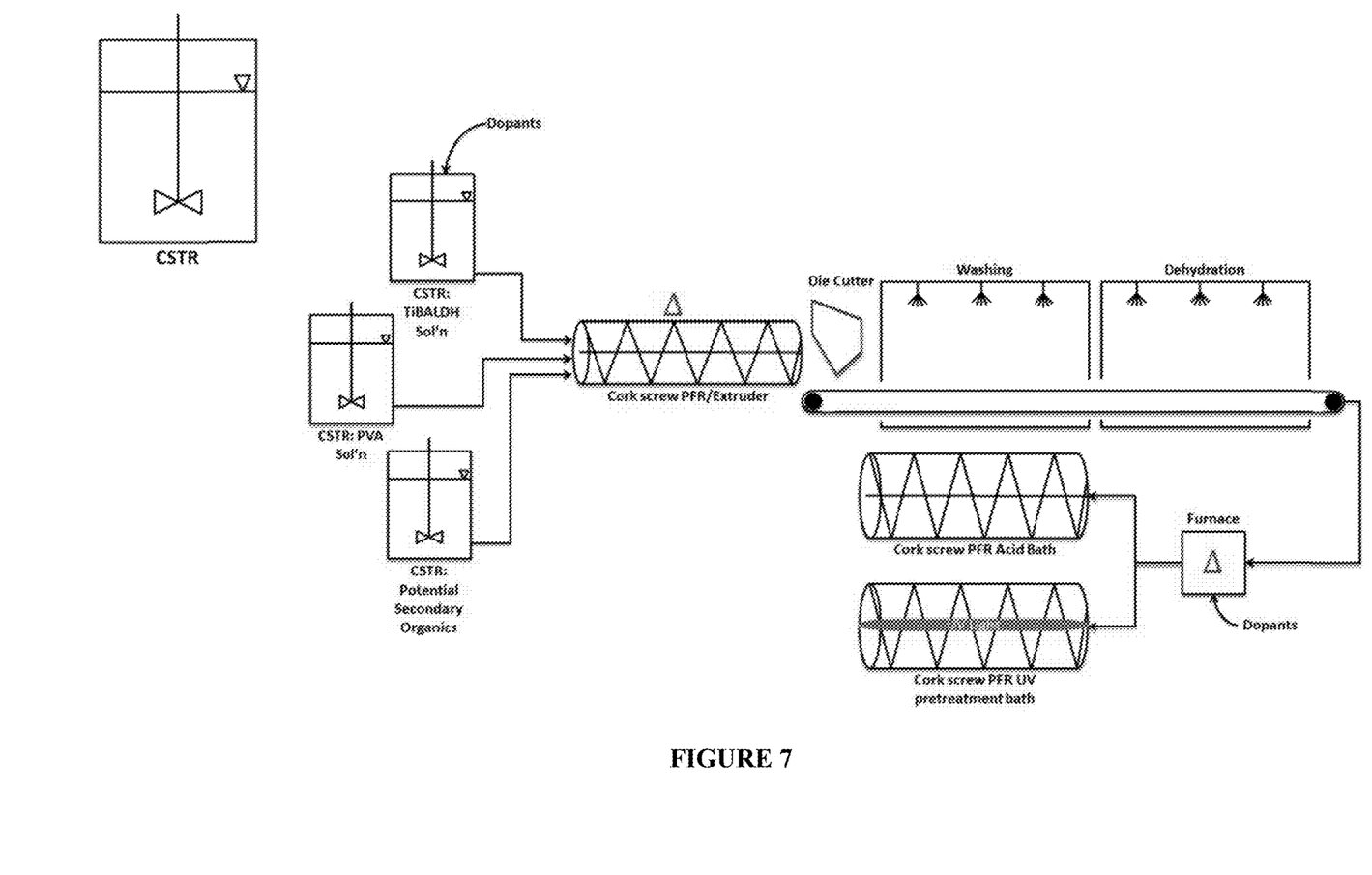
FIG. 7 is a sample continuous reactor process schematic.
Figure 8:
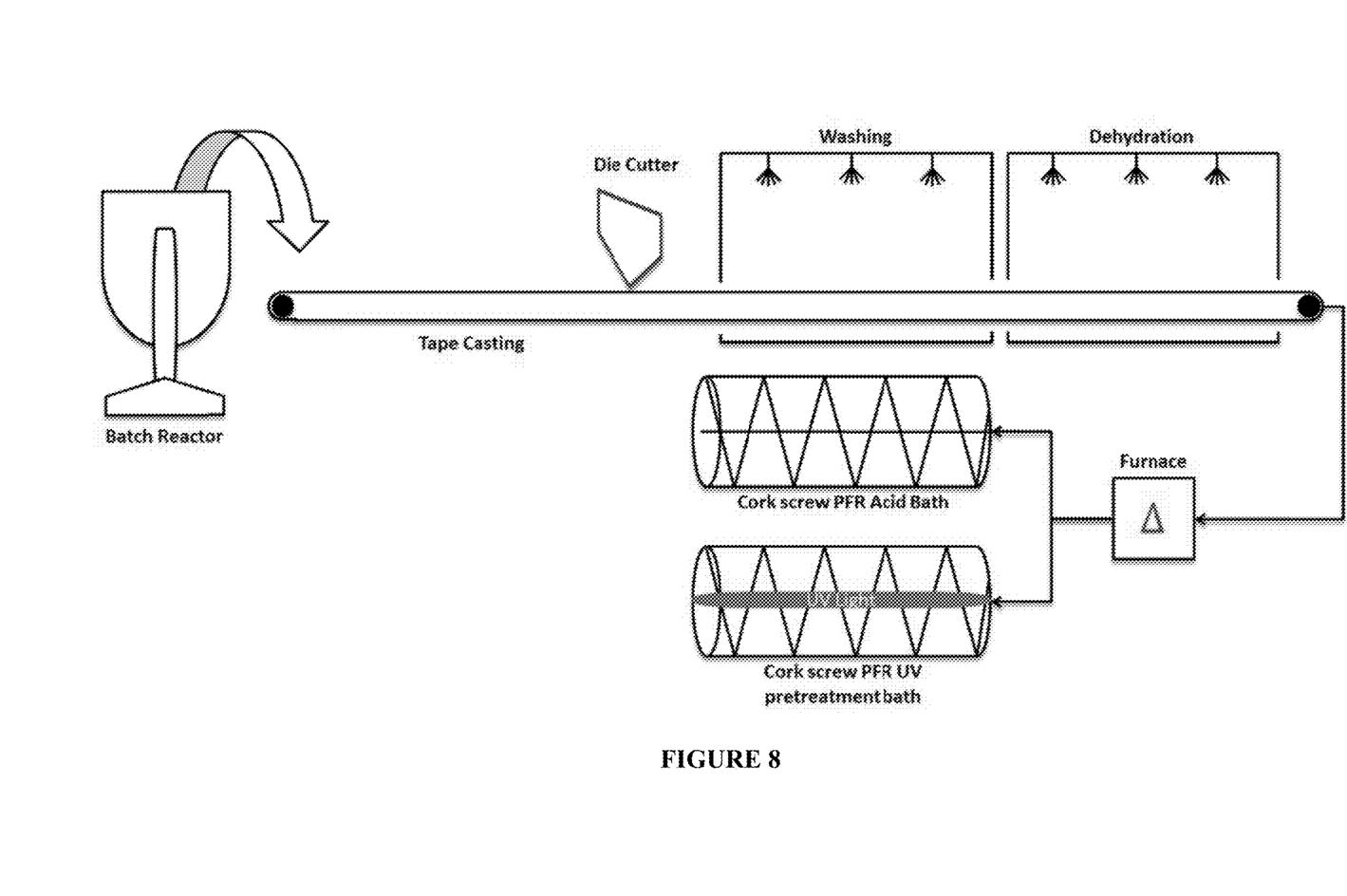
FIG. 8 is a sample continuous reactor process schematic.

One such configuration of the continuous reactor process is illustrated in FIG. 3 (see also FIGS. 4-9). This process design may include, but is not limited to, the use of continuously stirred tank reactors (CSTR) to mix a metal precursor (e.g., TiBALDH precursor) and to dissolve the dispersant (e.g., PVA) with water which are then simultaneously combined in a heated (>80° C.) plug flow reactor (PFR) where the gelled $TiO_2$-organic composite, for example, is extruded and machined to the desired size and geometry. Using such techniques extruded material can be formed into desired structures such as mesh structure, membranes, wires and the like. Subsequently the machined composite is washed to remove reaction by-products and is dehydrated by one of several methods such as ethanol or controlled humidity chamber to reduce stress due to drying. To remove the organic and produce the porous photocatalytic membrane the materials are then fired in a furnace (>400° C.) to remove the organic. Any residual organic that may remain may be removed by subsequent processes such as an acid bath that may be carried out via another PFR reactor or by an UV irradiated PFR which exploits the photocatalytic activity of the material and minimizes use of hazardous reactants.

In one process, the metal oxide precursor can be mixed in a CSTR to prehydrolyze it and feed it into a single or twin screw extruder that is heated and has a flow stream added that contains the dispersant. At the end of this extruder, the mixture of metal oxide and dispersant will solidify and can be cut by a die at the end of the extruder. The material can then be placed in a drying oven (T>40° C.) to remove adsorbed water. After drying, the material can either go to a furnace heated to T>300° C. to burn off the dispersant or to another heated reactor containing a solvent (acid, base or solvent) to remove the dispersant.

In another reaction, the 2 CSTRs in parallel can contain metal oxide precursor and dispersants, respectively. These CSTRs can feed into another CSTR, which will enable mixing to the point of gellation. Immediately prior to gellation, the mixture can be fed onto a conveyor belt that is heated to drive the final gellation. This conveyor will lead to a die, which can cut the material into any shape or size needed. The material can then be placed in a drying oven (T>40° C.) to remove adsorbed water. After drying, the material can either go to a furnace heated to T>300° C. to burn off the dispersant or to another heated reactor containing a solvent (acid, base or solvent) to remove the dispersant.

For example, the compositions find use in water purification. For example, pharmaceuticals and personal care products (PPCPs), surfactants, and various industrial chemicals are known to be endocrine disrupting compounds (EDCs) and are currently not removed by typical wastewater treatment practices.

A number of embodiments of the invention have been described. Nevertheless, it will be understood that various modifications may be made without departing from the spirit and scope of the invention. Accordingly, other embodiments are within the scope of the following claims.

What is claimed is:

1. A method for fabricating a metal-organic composite having a defined size and geometry, comprising:
    reacting a precursor for a compound with an organic dispersing agent in a solvent so as to obtain a metal-organic composite comprising a nanostructure that includes the compound cross-linked by the dispersing agent, wherein the compound is selected from the group consisting of metal oxides, metal sulfides, metal selenides, metal tellurides, metal nitrides, metal phosphides, and metal arsenides, and wherein the reaction is carried out at a pH from 6 to 11, at a temperature from 25° C. to 250° C. and at a pressure from 14 to 150 psi; and
    extruding and/or machining the metal-organic composite to have a defined size and geometry;
    drying the metal-organic composite by using a critical point dryer or by heating the composite in a drying oven; and
    heating the metal-organic composite at a temperature greater than 300° C. to partially or fully pyrolyze the dispersing agent.

2. A method for fabricating a substrate coated with a metal-organic composite, comprising:
    mixing a precursor for a compound with a dispersing agent in a solvent so as to obtain a metal-organic composite comprising a nanostructure that includes the compound cross-linked by the dispersing agent, the compound being selected from a group consisting of metal oxides, metal sulfides, metal selenides, metal tellurides, metal nitrides, metal phosphides, and metal arsenides, and
    wherein the reaction is carried out at a pH from 6 to 11 and at a temperature from 25° C. to 250° C.;
    coating a substrate with the metal-organic composite, and
    heating the metal-organic composite at a temperature greater than 300° C. to partially or fully pyrolyze the dispersing agent.

3. The method of claim 1 or 2, wherein the precursor is selected from the group consisting of aluminum bis-ethylacetoacetate monoacetylacetonate, aluminum diacetylacetonate ethyl acetoacetate, aluminum monoacetylacetonate bispropyl acetoacetate, aluminum monoacetylacetonate bisbutyl acetoacetate, aluminum monoacetylacetonate bishexyl acetoacetate, aluminum monoethyl acetoacetate bispropyl acetoacetonate, aluminum monoethyl acetoacetate bisbutyl acetoacetonate, aluminum monoethylacetoacetate bis-hexyl acetoacetonate, aluminum monoethylacetoacetate bisnonylacetoacetonate, aluminum dibutoxide monoacetoacetate, aluminum dipropoxide monoacetoacetate, aluminum butoxide monoethylacetoacetate, aluminum-s-butoxide bis(ethyl acetoacetate), aluminum di-s-butoxide ethylacetoacetate, aluminum-9-octadecenyl acetoacetate diisopropoxide, titanium allylacetoacetate triisopropoxide, titanium di-n-butoxide (bis-2,4-pentanedionate), titanium diisopropoxide (bis-2,4-pentanedionate), titanium diisopropoxide bis(tetramethylheptanedionate), titanium diisopropoxide bis(ethyl acetoacetate), titanium bis ammonium lactato dihydroxide (TiBALDH), titanium methacryloxyethylacetoacetate triisopropoxide, titanium oxide bis(pentanedionate), titanium chloride, titanium sulfate, zirconium allylacetoacetate triisopropoxide, zirconium di-n-butoxide (bis-2,4-pentanedionate), zirconium diisopropoxide (bis-2, 4-pentanedionate), zirconium diisopropoxide bis(tetramethylheptanedionate), zirconium diisopropoxide bis(ethylacetoacetate), zirconium methacryl icoxyethylacetoacetate triisopropoxide, zirconium butoxide (acetylacetate) (bisethylacetoacetate), and iron acetyl acetonate.

4. The method of claim 1 or 2, wherein the precursor is titanium bis ammonium lactato dihydroxide (TiBALDH).

5. The method of claim 1 or 2, wherein the dispersing agent is selected from phosphoglycerides; dioleylphosphatidyl ethanolamine (DOPE); dioleyloxypropyltriethylammonium (DOTMA); cholesterol; cholesterol ester; diacylglycerol; diacylglycerolsuccinate; diphosphatidyl glycerol (DPPG); hexanedecanol; polyethylene glycol (PEG); polyoxyethylene-9-lauryl ether; palmitic acid; oleic acid; fatty acid amides; sorbitan trioleate (Span 85); polysorbate 80 (TWEEN-80); sodium cholate methyl cellulose; gelatin; surfactin; a poloxomer; a sorbitan fatty acid; phosphatidylserine; phosphatidylinositol; phosphatidylethanolamine (cephalin); cardiolipin; phosphatidic acid; dicetylphosphate; dipalmitoylphosphatudylglycerol; stearylamine; dodecylamine; hexadecylamine; acetyl palmitate; glycerol ricinoleate; hexadecyl sterate; isopropyl myristate; tyloxapol; poly(ethylene glycol) 5000-phosphatidylethanolamine; polyvinyl alcohol (PVA); phospholipids; poloxamers, Poly(vinylphosphonic acid)Poly(acrylic acid), Poly(vinylsulfonic acid), Poly(methacrylic acid), poly(phosphonic acid) or any combinations thereof.

6. The method of claim 5, wherein the dispersing agent is polyvinyl alcohol.

7. The method of claim 1 or 2, wherein the reaction is carried out at a pH from 7.8 to 9.

8. The method of claim 1 or 2, wherein the precursor is titanium bis ammonium lactato dihydroxide (TiBALDH) and the dispersing agent is polyvinyl alcohol.

9. The method of claim 8, wherein the ratio of TiBALDH to PVA is between about 1:50 and 1:100,000.

10. The method of claim 1 or 2, wherein the reaction is carried out at about 150° C.

11. The method of claim 2, wherein the substrate is a light transmitting material.

12. The method of claim 11, wherein the substrate is a fiber optic wire or tube.

13. The method of claim 1, wherein the nanostructure is one of multiple nanostructures included in the metal-organic composite and different nanostructures are cross linked by the dispersing agent.

14. The method of claim 1, wherein the dispersant cross-links with the compound while the compound is being formed through a hydrolysis-condensation reaction.

* * * * *